(12) United States Patent
Bleau

(10) Patent No.: US 8,303,388 B1
(45) Date of Patent: Nov. 6, 2012

(54) INTERACTIVE GAME FOR PROMOTING SELF-EXPRESSION

(76) Inventor: Erik Steven Bleau, Highland, NY (US)

( * ) Notice: Subject to any disclaimer, the term of this patent is extended or adjusted under 35 U.S.C. 154(b) by 885 days.

(21) Appl. No.: 12/333,890

(22) Filed: Dec. 12, 2008

Related U.S. Application Data

(60) Provisional application No. 61/007,485, filed on Dec. 13, 2007.

(51) Int. Cl.
*A63F 9/24* (2006.01)
(52) U.S. Cl. ............... 463/10; 463/11; 463/31
(58) Field of Classification Search .......... None
See application file for complete search history.

(56) References Cited

U.S. PATENT DOCUMENTS

| | | | |
|---|---|---|---|
| 4,186,925 A * | 2/1980 | Goldfarb et al. .......... 273/389 |
| 4,216,594 A | 8/1980 | Farley et al. | |
| 4,456,259 A | 6/1984 | Antal et al. | |
| 4,682,956 A | 7/1987 | Krane | |
| 4,815,976 A | 3/1989 | Krane | |
| 4,850,597 A | 7/1989 | Milliken | |
| 4,940,239 A | 7/1990 | Tuttle | |
| 4,966,371 A | 10/1990 | Sherman | |
| 4,971,561 A | 11/1990 | Krane | |
| 5,071,134 A | 12/1991 | Burroughs, Jr. | |
| 5,244,391 A | 9/1993 | Bryant | |
| 5,295,834 A | 3/1994 | Saunders | |
| 5,738,354 A | 4/1998 | Easley | |
| 5,906,371 A | 5/1999 | Peterson | |
| 5,931,469 A | 8/1999 | Stichnoth | |
| 6,070,874 A | 6/2000 | Ivers | |
| 6,279,909 B1 | 8/2001 | Alexander, II et al. | |
| 6,402,143 B1 | 6/2002 | Brindley | |
| 6,669,196 B1 | 12/2003 | Washko | |
| 6,715,762 B2 | 4/2004 | Simmons | |
| 7,007,952 B2 | 3/2006 | Nelson | |
| D525,663 S | 7/2006 | Ambrose | |
| 2009/0075732 A1* | 3/2009 | Sanders .......... 463/31 |
| 2010/0041453 A1* | 2/2010 | Grimm, Jr. .......... 463/6 |

* cited by examiner

*Primary Examiner* — David E Graybill
(74) *Attorney, Agent, or Firm* — Calhelha & Doyle, LLC

(57) ABSTRACT

An interactive game and method for promoting self-expression and awareness and improving group dynamics involves a game of chance goal for selecting a random performance activity from among various self-awareness and self-expression questions, physical challenges, and role-play scenarios, and including the possibility of passing a question or challenge to another participant.

9 Claims, 4 Drawing Sheets

INTERACTIVE GAME FOR PROMOTING SELF-EXPRESSION

CROSS-REFERENCE TO RELATED APPLICATION

This application claims the benefit of co-pending provisional application Ser. No. 61/007,485 filed Dec. 13, 2007 and which is incorporated herein by reference.

FIELD OF THE INVENTION

The present invention relates to an interactive game to facilitate self-expression among a group of participants, particularly adolescents.

BACKGROUND OF THE INVENTION

In group settings, participants often have difficulties identifying emotions and sharing them with their peers. Other skill areas which may benefit from regular practice and improvement include communication skills, public speaking and problem solving.

Additionally, other aspects of group dynamics can be improved or facilitated including getting acquainted exercises, increasing spontaneity and helping group participants to adapt to different social situations.

All of the foregoing areas can be improved with attention to self-expression and self-awareness, as well as growing, sharing, self-exploration and interaction, all done in a comfortable, secure, safe and fun setting provided by the interactive game and method described herein.

The subject interactive game facilitates sharing of feelings and ideas, particularly from adolescents. This is especially useful with troubled adolescents who lack self-awareness and have difficulty expressing themselves. Adolescents appear to be more willing to share their thoughts, ideas and feelings within the context of a game because there is security in having an excuse, in being able to say that they are only sharing because those are the rules of the game. Participants also benefit by "getting feelings off their chest." This game can serve to break the ice among newcomers and allow them to get to know each other better. This can be especially important in a setting where there is significant "turnover," i.e. for groups having different people coming and going. This game also helps with goal setting and can be an aid in navigating through the turbulent teens years.

A moderated version of the game may be used to explore topics of interest for a group which might not naturally focus upon important or awkward topics, e.g. behavior, ethics or health issues may be easily discussed with this method when used in a mandatory attendance group setting such as sometimes required in a school or institution. It is also contemplated that a moderator may readily adjust any scenario or physical challenge to suit the mental, physical and emotional needs and abilities of differently-abled individuals.

Also, alternative activity card sets may be offered for different intended audiences which may vary by age, abilities and interests. Furthermore specialized subject area sets of activities or cards can be offered such as sports, trivia, languages and topical subjects, among many others.

SUMMARY OF THE INVENTION

The interactive game system for promoting self-expression involves a game of chance goal, various self-awareness and self-expression questions, physical challenges, and the option to pass a question or challenge to someone else. The chance goal is accomplished by means of a randomizing event of some type, for selecting participants and activities. Although a simple spinner or dice can be used, a randomizing action or activity is preferred. A particularly suitable randomizing device can be a ball, beanbag or similar object tossed in the direction of random array of activity cards for selecting performances by the participants.

A randomizing device such as a ball toss arrangement serves the multiple purposes of having a participant leave one's seat, position themselves in a play zone in front of an audience of co-participants, focus upon the task at hand (i.e. aiming and tossing an object), and minimizing the awkwardness involved when one is the center of attention. Such a participant may then be more willing to perform the next activity or role-playing scenario.

One version of this game may be comprised of a rectangular box tray preferably made of plastic or sturdy corrugated board, typically with a hinge to prop the lid of the box open (e.g. like a briefcase). This lower part of the box also has bin compartments or sections containing a variety of different questions or physical challenges. These are preferably provided on printed cards. Other means of providing selected activities may be utilized, including programmable game play as described below.

In one random selection method, differently configured objects such as a red and green rubber ball may be bounced into the tray bins for determining the questions or physical challenges to be played. In one version, the participant must perform the activity selected by the red ball but may pass the activity selected by the green ball to another participant.

Game players, particularly adolescents, enjoy completion and the subject game may be scored as desired, and a scoring device such as a chart or pad may be used. Individual sections will typically have different types of questions, or challenges, and point values can be assigned to each card depending on the difficulty of the question or physical challenge.

It is contemplated that the subject game for promoting self-expression will be equally effective without the need for scoring points, but rather by offering the qualitative judgments of the participant or moderator. In such case, good performances can be cheered on and lackluster performances can be encouraged to try again or improve next time.

Questions can also be altered for younger or older participants, or indeed for any audience having special needs such as language skills, physical limitations, or participants with particular mental or emotional capabilities.

The game is particularly suitable for use when a moderator or facilitator desires to spur interaction with a subject group. But the game will play equally well among the participants themselves, without a moderator. One advantage of having a moderator is to dismiss or overrule actions and questions as may be appropriate for a particular audience.

Other objects, features and advantages of the present invention will be apparent when the detailed descriptions of the preferred embodiments of the invention are considered with reference to the accompanying drawings, which should be construed in an illustrative and not limiting sense as follows:

DETAILED DESCRIPTION OF THE PREFERRED EMBODIMENTS

Figure 1:
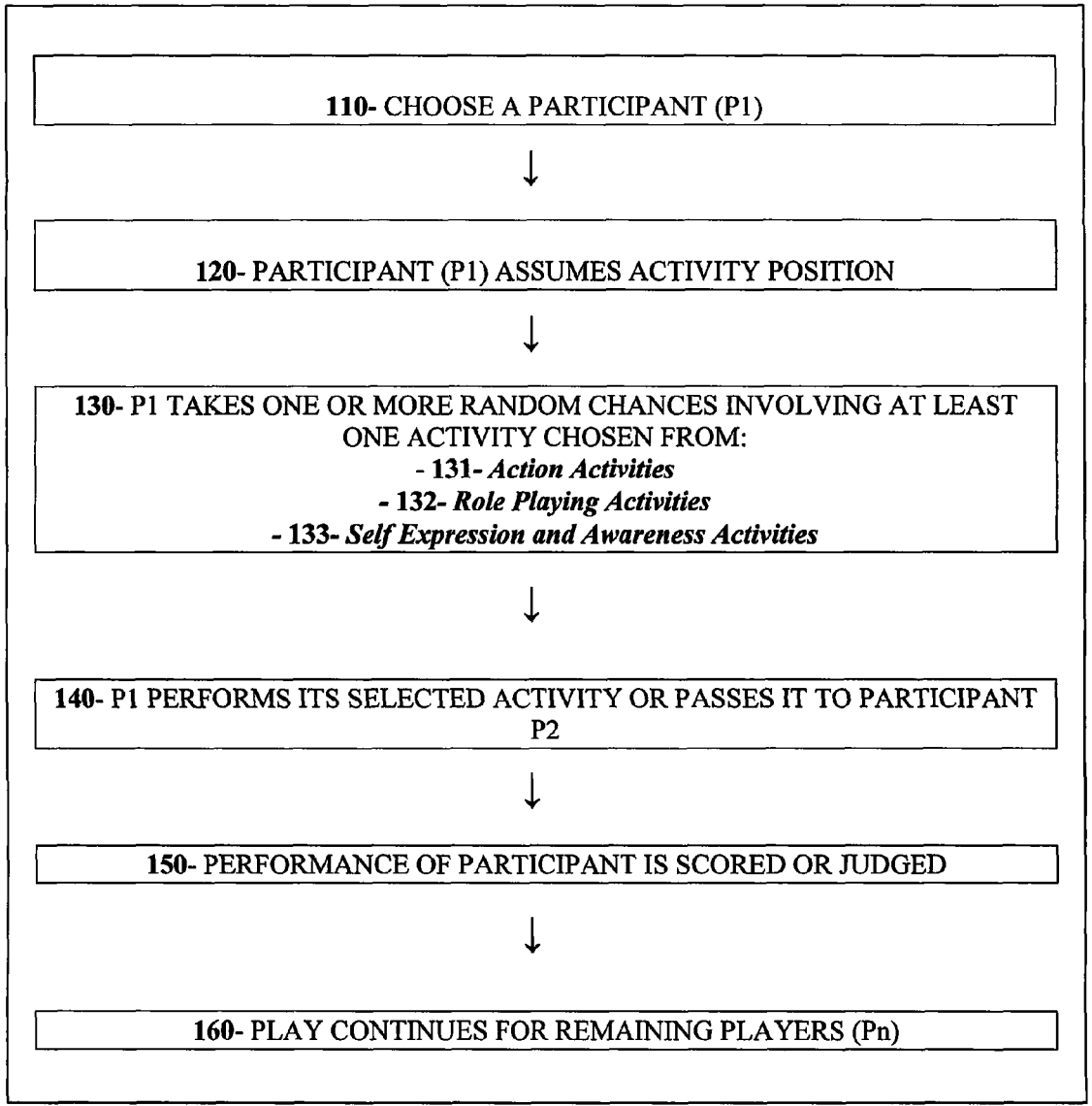
FIG. 1 is a process diagram for game play in one embodiment of the subject method for promoting self-expression.

FIG. 1 depicts a method 100 of promoting self expression or awareness among members of a group, comprising the steps of choosing a first participant 110; providing an activity performance zone for the participant and positioning the participant in the activity performance zone 120; taking one or more random chances 130 wherein the random chances involve selection of at least one activity chosen from among action choices 131, role playing choices 132, and self expression or awareness activity choices 133; performing the selected activity choice by the first participant or alternatively passing an activity choice to a second participant for performance by said second participant 140; scoring or judging the activity performance of either said first or second participant or both said participants 150; and repeating game play among any remaining players. The performance zone can vary but typically it will be an area in front of an audience of participants where a player may access the randomizing device and the activity cards. A circle of seated players with a performing participant in the center is also useful.

Figure 2:
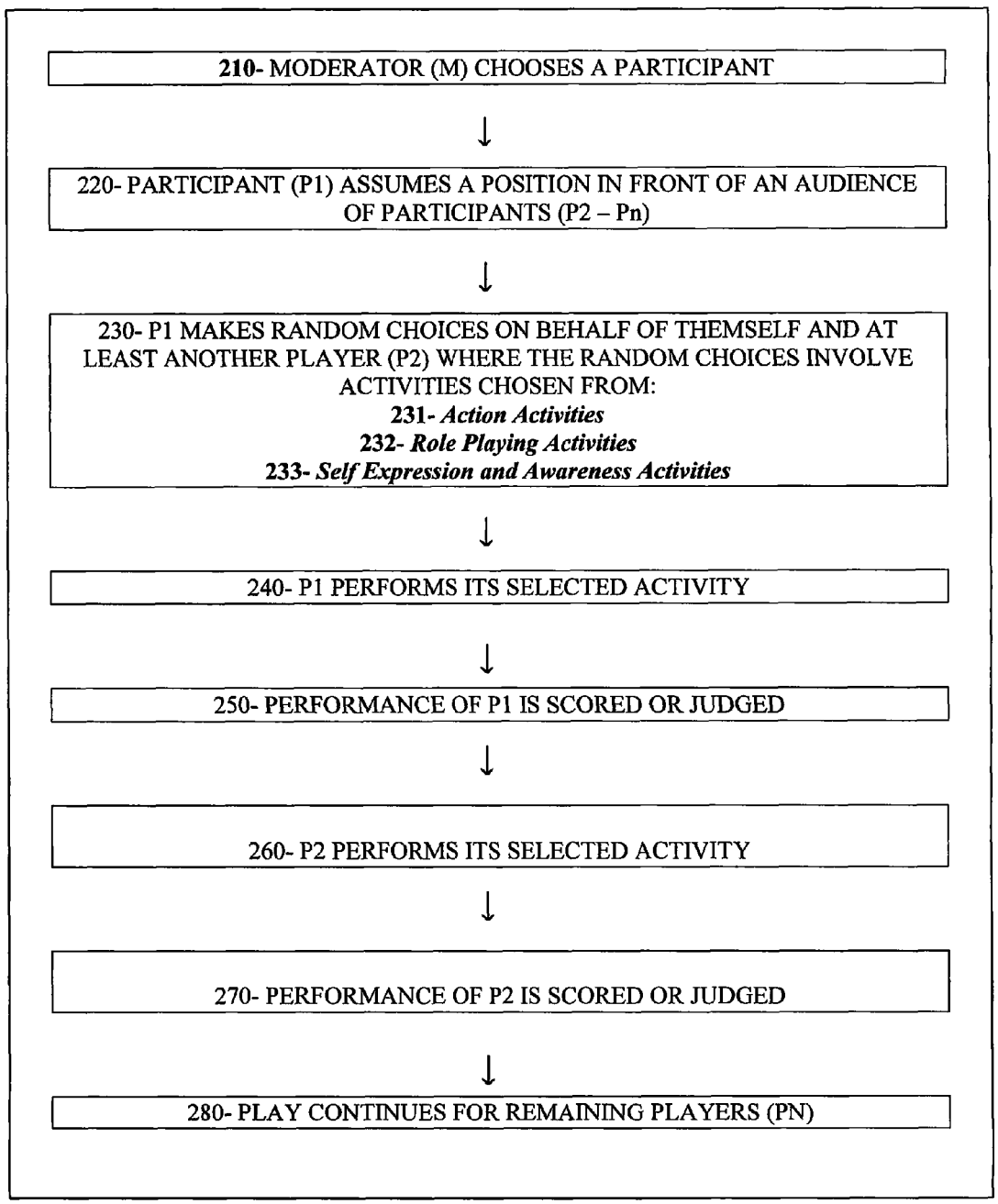
FIG. 2 is a process diagram for game play in another embodiment of the subject method.

FIG. 2 depicts a moderated activity 200 for promoting self expression or awareness among members of a group, comprising the steps of: choosing a first participant by a moderator 210; providing an activity performance zone in front of an audience of participants and positioning the first participant in the activity performance zone 220; providing random activity choices 230 for the first participant and at least a second participant, wherein the random activity choices involve at least one activity chosen from among action 231, role playing 232, and self expression and awareness activities 233; performing a first selected random activity by the first participant 240 and scoring or judging said first participant performance by the moderator 250, or alternatively passing the activity choice to a second participant for performance by said second participant 260, and scoring or judging said second participant performance by the moderator 270; and repeating game play among any remaining players.

In any version of the game method, scoring or judging is optional as desired by the participants who may play competitively or as a method of offering encouragement, openness and improved skills.

Figure 3:
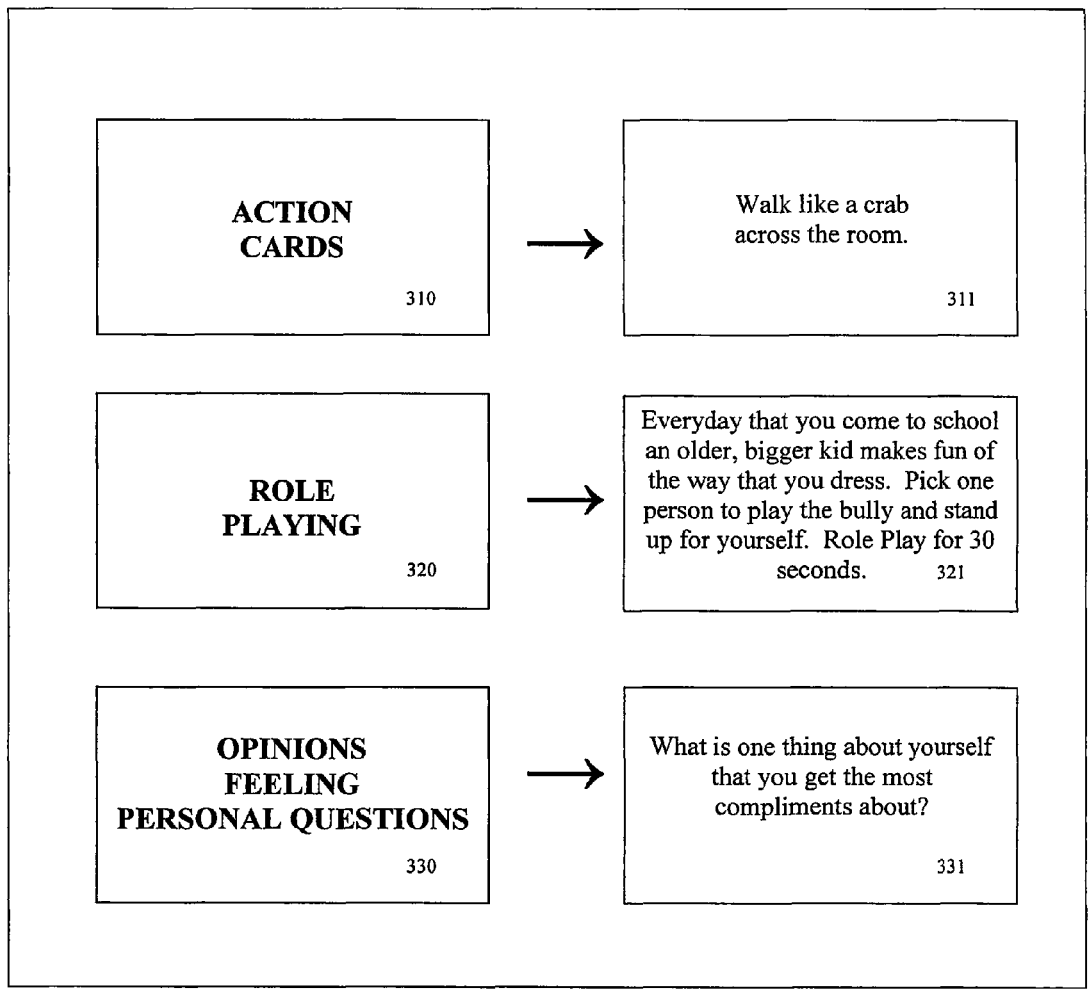
FIG. 3 is a schematic representation for activity cards suitable for use in an embodiment of the game.

FIG. 3 sets of activity cards 300 useful for promoting self-expression and awareness among a group of participants. Action card 310 may have a physical activity or challenge 311 on its reverse side. Role Playing card 320 may offer a situational activity or challenge 321 on its reverse side. Opinions, Feelings and Personal Question cards 330 may offer a variety of opportunities for self expression such as question 331.

Action Cards will offer a variety of activities and physical challenges. A typical set of Action Cards intended for adolescents may offer activities including: Walk like a crab across the room; Do 10 squat thrusts; Pretend that you are a ballet dancer and perform ballet for 10 seconds; Do 10 armchair pushups; Break-dance for 10 seconds; Hop on one foot for 10 seconds; Do 10 pushups; Do 10 jumping jacks; Hop for 10 seconds alternating feet; Sprint in place for 10 seconds; Skip back and forth across the room; Do 10 sit-ups; Imitate your favorite animal for 10 seconds; and Pretend that you are a basketball player and play "Air Basketball" showcasing your flashiest dribbling and shooting moves for 10 seconds. All such activities can be adjusted by a moderator to accommodate the abilities of particular participants.

Role Playing Cards will encourage the participants to formulate and perform situational scenes for exploring issues of importance or interest. A typical set of Role Playing Cards intended for adolescents may offer situations including: "You are in class and the kid sitting next to you throws a paper airplane across the room. The teacher thinks that you threw it and tells you to take your desk out into the hall. Pick 2 people to play the teacher and the troublemaker and Role Play dealing with the situation. Role Play for 30 seconds."; "Everyday that you come to school an older, bigger kid makes fun of the way that you dress. Pick one person to play the bully and stand up for yourself Role Play for 30 seconds."; "You are a starting player on the football team but you have been having the worst game of your career. There is now only enough time for one more play and you need a Touchdown to win the game. Convince your coach to run the last play for you and that you can score the last touchdown. Pick someone to play your coach and Role Play for 30 seconds."; "You and of your friends drove to a party. The driver and the only person with a license decided that he was going to start drinking alcohol. Convince him and your other friend that the 3 of you need to call one of your parents to pick you up. Role Play and pick 2 people to play your friends."; and "You had a page book report due today which you genuinely completed but forgot at home. Pick one person to play your teacher and convince them that you really did the report and will bring it tomorrow. Role Play for 30 seconds." All role playing scenarios can be adjusted by a moderator to accommodate the physical and emotional abilities of the participants.

Self-expression and self-awareness can be encouraged with a set of questions invoking Opinions, Feelings and Personal Questions. A typical set of cards intended for adolescents may offer questions including: "If you could have any superpower what would it be and why?"; "What are the 3 things that you like best about your best friend?"; "What is one thing about yourself that you get the most compliments about?"; "List 3 reasons why you are friends with the people that you are friends with."; "Have you ever planned a surprise party or special day for a family member or friend? Describe how it went"; "If your family and friends were asked if they thought that you take yourself too seriously what do you think they would say?"; "At home who would you say "wears the pants" in your family your Mom or Dad? Explain."; "Do you think you have a hard time or an easy time making friends? Explain."; "Name one quality about yourself that helps or hurts your ability to make friends in your opinion."; "Give one example of when you gave into peer pressure."; and "Give one example of when you resisted peer pressure. How did you feel after each example?"

All of the foregoing card set activities and questions are exemplary and not limiting. Many additional activities, questions and role playing scenarios may be utilized.

Figure 4:
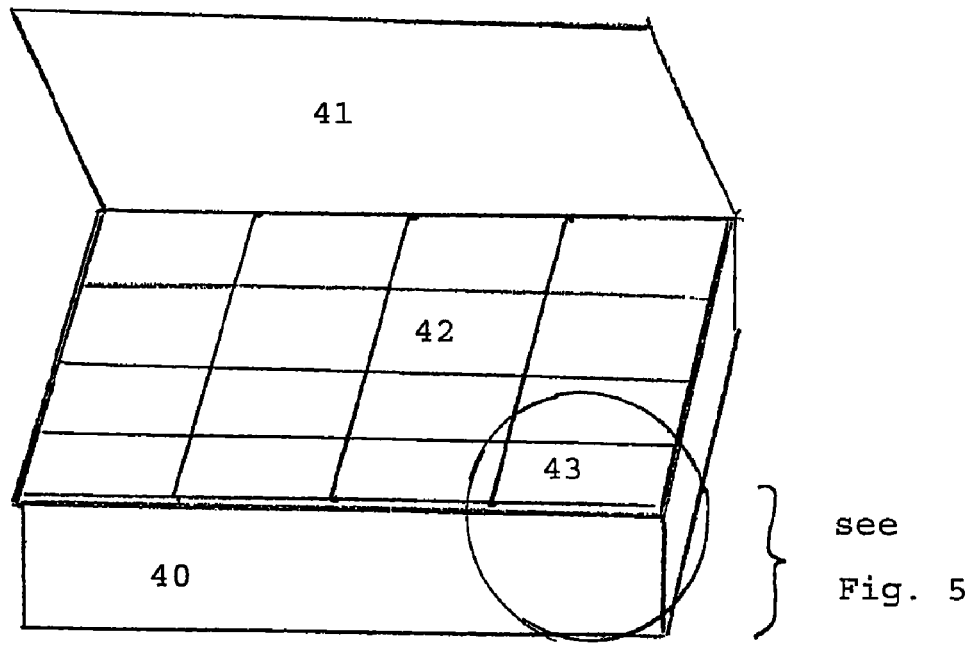
FIG. 4 is a perspective view of a game tray having an array of bins for containing random activity cards.

FIG. 4 is a perspective view of a game tray 40 useful in an embodiment of the subject game apparatus. Tray 40 has a lid 41 for randomly deflecting a ball or beanbag type article into a array of bins such as bins 42 and 43. The tray bins readily hold and provide an arrangement of game play activity cards.

Figure 5:
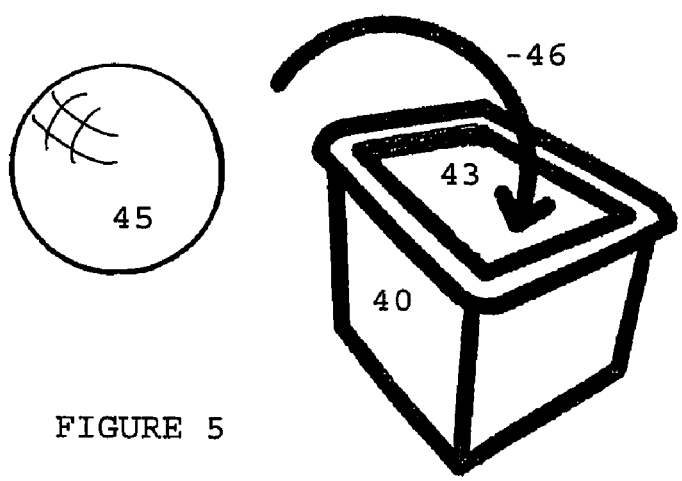
FIG. 5 is representative detail of a ball toss selection activity.

FIG. 5 is a representation of a detail of the device shown in FIG. 4 whereby a ball 45 tossed in the direction of tray 40 via path 46 may arrive at bin 43 and thereby selecting an activity card stored therein.

A variety of game versions may be developed with the same basic game constraints. Degree of difficulty for action cards and degree of complexity for role playing and degree of nuance in personal questions may vary with targeted age and ability-specific groups. Language skills (ESL), or subject matter (e.g. math, science, sports, trivia), can be the subjects of further editions, particularly when a teacher, counselor or moderator is involved with a specific subject and group of participants.

Card selection using random red and green ball tosses is useful for combining a random selector with the act of getting up to perform the action. Other means, such as dice or a spinner, can be adapted according to the needs of the participants. Some players may be physically challenged and the game can be readily adapted to fulfill their needs.

A variety of scoring and tracking systems may be used and tailored to the audience. Points can be listed on the cards according to degree of difficulty and these may be accumulated by a player or team graphically on a score sheet or by means of tokens, colored chips and the like. As mentioned, judging may also be qualitative when encouragement and fun are emphasized over competitiveness. For younger audiences counting and accumulating may be a desirable skill to emphasize.

The game system described herein may be readily adapted to a logically programmable computing device capable of providing both the randomizing aspects of the system and for displaying text representing random activity choices involving activities chosen from among action, role playing, self expression and awareness activities. Computer programs and handheld devices may both be used in practice of the subject game.

Typically, game apparatus will also include rules, activity guidance and interpretive materials of use to players, counselors, teachers and moderators.

The following example illustrates a typical game embodiment for an interactive, sell-expression version of the subject game. Turns are established using a clock face spinner included in the game. The player spinning the highest number goes first and players can play individually or as members of teams. Before play, each of three coded categories of cards are shuffled and dealt into the appropriate compartment bins indicated in a game tray. The card categories have different artwork or colors for sorting convenience.

In turn, each player bounces a red and a green rubber ball into the game tray, for selecting activity cards to be played. The tray bin compartments contain a variety of cards with different questions. "Self-expression" questions are personal, emotionally based questions that the participants have to think about. "Physical challenge" or action questions are all challenges designed to get the participants up and moving, providing a physical component to the game. "Role playing" cards are a series of situations that participants can relate to and are designed to promote problem solving and teamwork. In this example of the game, the role playing cards are aimed at teenagers. Any question from a bin into which the red ball is bounced must be addressed by the first participant, while a question in the box that has the green ball may be optionally addressed or passed to someone else in the group. When playing in teams, the green selected question may be passed to an opposing team. All of the cards in the game can have different point values depending on their degree of difficulty. The "self-expression" questions may have point values from 1-5. The "physical challenges" may have point values from 1-5 as well. And the "role playing" cards may be worth 10 points each. Points are conveniently tracked through tabulation sheets which are included with the game, or suitable score boards or colored tokens may be used for visibility among a large number of players. The person or team accumulating the most points by the end of the game wins. If two or more players are tied at the end of the game, a "sudden death" round can take place to establish a winner. If neither the red ball nor the green ball bounces into any of the compartments, then no opportunity for accumulating points exists. Play may then continue with the next participant positioning themselves in the activity zone.

In practice, it has been seen that adolescents have been willing to share their thoughts, feelings, and ideas within the confines of this game.

Another version of the game is useful for larger groups such as a classroom of students. Players can be broken up into two teams or multiple teams if there are many participants. Points earned from the cards would be scored and the basic rules described above may apply.

The invention now being fully described, it will be apparent to one of ordinary skill in the art that many changes and modifications can be made thereto without departing from the spirit or scope of the invention as set forth herein.

The invention claimed is:

1. A game system for promoting self expression or awareness among members of a group, comprising:
   a first randomizing device for choosing a first participant;
   a second randomizing device for making random activity performance choices on behalf of either the first participant or at least a second participant, said second randomizing device being the same or different from said first randomizing device, wherein the random activity performance choices involve at least one activity chosen from among action, role playing, self expression and self awareness performance activities;
   an activity performance zone designed to place and position a participant in front of an audience of remaining players to perform the selected action, role playing, self expression and self awareness performance activity; the performance thereafter scored or judged; and
   a tracking mechanism for scoring performance progress of the participants and tracking continuing play by any remaining players.

2. The game apparatus of claim 1 wherein the randomizing device is selected from the group consisting of an object toss and bin arrangement, a spinner and dice.

3. The game apparatus of claim 1 wherein the randomizing device for choosing a first participant is a object toss and bin arrangement for selecting a stack of printed activity performance cards.

4. The game apparatus of claim 3 wherein the object toss and bin arrangement utilizes a ball or bag toss.

5. The game apparatus of claim 3 wherein the printed performance activity cards offer a plurality of action, role playing, self expression and awareness performance activities.

6. The game apparatus of claim 1 wherein the randomizing devices are logically programmable computing devices capable of displaying text representing random activity performance choices involving at least one activity chosen from among action, role playing, self expression and awareness performance activities.

7. The game apparatus of claim 1 further comprising rules.

8. The game apparatus of claim 1 further comprising activity guidance.

9. The game apparatus of claim 1 further comprising interpretive materials.

* * * * *